3,047,528
ELASTOMER COMPOSITION
Ben A. Bluestein, Schenectady, N.Y., assignor to General Electric Company, a corporation of New York
No Drawing. Filed Aug. 15, 1960, Ser. No. 49,449
15 Claims. (Cl. 260—37)

This invention relates to improved organopolysiloxane elastomer compositions which are convertible to the solid, cured, elastic state, to the method of curing these compositions and to the cured silicone rubber resulting from the curing operation.

Organopolysiloxane elastomers are well known in the art and find many uses in applications where their thermal resistance, chemical inertness, and low temperature flexibility are desirable characteristics. These organopolysiloxane elastomers are generally prepared from an organopolysiloxane gum which is convertible to the solid, cured, elastic state, a filter, and a peroxide curing agent. These organopolysiloxanes are conventionally materials which contain an average of about 2 organic groups per silicon atom, with the organic groups being attached to silicon through silicon-carbon linkages. Generally, the organic groups are monovalent hydrocarbon radicals and halogenated monovalent hydrocarbon radicals, with the usual materials containing organic radicals which comprise a major portion of methyl radicals with, in some cases, a minor proportion of phenyl radicals, vinyl radicals, chlorophenyl radicals and cyanoalkyl radicals.

The conventional curing agents for these conventional organopolysiloxanes are organic peroxides. These organic peroxides provide a very satisfactory cure of the conventional organopolysiloxanes, but result in certain disadvantages. For example, the reaction products of the organic peroxides and the organopolysiloxanes include various organic acids. The presence of these organic acids are often detrimental to the properties of the organopolysiloxanes, particularly when the organopolysiloxanes must operate at elevated temperatures under humid conditions or in a closed environment. These acid decomposition products tend to increase the rate of hydrolytic degradation (reversion) of the cured organopolysiloxane. Furthermore, these organic peroxides are not satisfactory as curing agents when finely divided carbon is used as a filler.

The present invention is based on my discovery of an improved organopolysiloxane composition which can be converted to the solid, cured, elastic state without the disadvantages of the conventional peroxide curing systems and which can be used to cure carbon-filled materials. In particular, I have found that satisfactory curing of certain types of organopolysiloxane compositions to the solid, cured, elastic state can be effected employing various polyvalent metal compounds as curing catalysts. The particular organopolysiloxanes to which this polyvalent metal compound cure is applicable are the organopolysiloxanes in which at least some of the silicon-bonded organic groups are silicon-bonded carboxyalkyl radicals.

Briefly stated, my invention is directed to a composition comprising (A) an organopolysiloxane having a viscosity of at least about 100,000 centistokes when measured at 25° C., with an average of about 2 organic groups per silicon atom with at least a portion of the organic groups being silicon-bonded carboxyalkyl radicals, (B) a filler selected from the class consisting of finely divided silica and finely divided carbon and (C) as a curing agent a compound of a polyvalent metal. My invention is also directed to the method of curing the aforementioned composition by the application of heat thereto and to the cured silicone rubber resulting from such cure. In the preferred embodiment of my invention, the organo groups of the organopolysiloxane comprise silicon-bonded methyl groups and silicon-bonded carboxyethyl groups, the filler is a silica filler and the compound of the polyvalent metal is zinc oxide.

As a class of compositions, organopolysiloxanes containing both silicon-bonded carboxyalkyl radicals and silicon-bonded monovalent hydrocarbon radicals or halogenated monovalent hydrocarbon radicals are known in the art. For example, French Patent 1,158,808 discloses a number of such materials and their preparation. Other such materials and their method of preparation are disclosed in U.S. Patent 2,900,363—Bluestein. While this broad generic disclosure of organopolysiloxanes containing both silicon-bonded carboxyalkyl radicals and silicon-bonded monovalent hydrocarbon radicals or halogenated monovalent hydrocarbon radicals is known in the art, it should be understood that the organopolysiloxanes employed in the practice of the present invention (which will be referred to sometimes hereinafter as "carboxyalkyl organopolysiloxanes") include only those carboxyalkyl organopolysiloxanes having a viscosity in excess of about 100,000 centistokes and which contain an average of about 2 organic groups (including carboxyalkyl radicals) per silicon atom with the organic groups being attached to silicon through silicon-carbon linkages.

While the carboxyalkyl organopolysiloxanes employed in the present invention have been described as containing about 2 silicon-bonded organic groups per silicon atom, it should be understood that some latitude is available in this ratio and satisfactory products are obtained when the ratio of organic groups to silicon atoms varies from about 1.999 to 2.001. In general, the number of silicon-bonded carboxyalkyl groups is relatively minor compared to the number of other silicon-bonded organic groups in the carboxyalkyl organopolysiloxane of the present invention. Generally, at least 0.01 percent of the silicon atoms in the carboxyalkyl organopolysiloxane contain a silicon-bonded carboxyalkyl radical. Preferably, from 0.1 to 10 percent of the silicon atoms in the carboxyalkyl organopolysiloxane contain a silicon-bonded carboxyalkyl radical.

While the nature of the carboxyalkyl radical is generally not critical, it is preferred that the alkyl portion of the carboxyalkyl radical contain from 2 to 3 carbon atoms and that the carboxy group be attached to a carbon atom other than a carbon atom attached directly to silicon through a silicon-carbon linkage. Thus, the preferred carboxyalkyl radicals in the carboxyalkyl organopolysiloxanes are beta-carboxyethyl, beta-carboxypropyl, and gamma-carboxypropyl radicals.

The preferred carboxyalkyl organopolysiloxanes employed in the practice of the present invention can be described by the following formula:

(1) 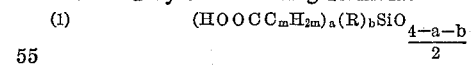

where $a$ has a value from 0.001 to 0.1, $m$ is an integer equal to from 2 to 3, inclusive, the sum of $a+b$ is equal to from 1.999 to 2.001, and R is a monovalent organic radical attached to silicon through a silicon-carbon linkage. Among the organic groups which R in Formula 1 can represent are included, for example, monovalent hydrocarbon radicals, halogenated monovalent hydrocarbon radicals and cyanoalkyl radicals, such as, for example, alkyl radicals, e.g., methyl, ethyl, propyl, butyl, octyl, etc. radicals; aryl radicals, e.g. phenyl diphenyl naphthyl, tolyl, xylyl, etc. radicals, aralkyl radicals, e.g., benzyl, phenylethyl, styryl, etc. radicals; cycloalkyl radicals e.g., cyclohexyl cycloheptenyl, etc. radicals; haloaryl radicals, e.g., vinyl, allyl, etc. radicals, cycloalkenyl radicals, e.g., cyclohexyl cycloheptenyl, etc. radicals; haloaryl radicals, e.g., chlorophenyl, dibromophenyl, tetrachlorophenyl, etc. radicals; haloalkyl radicals, e.g., chloromethyl, bromomethyl, beta-chloroethyl, etc. radicals; alkynyl radicals, e.g., ethynyl, etc. radicals; and cyanoalkyl radicals, e.g. beta-cyanoethyl, beta-cyanopropyl, gamma-cyanopropyl, etc. radicals. Because the carboxyalkyl organopolysiloxane of Formula 1 contains an average of about 2 organic groups per silicon atom, it is apparent that the organopolysiloxane is predominantly comprised of diorganosiloxane units having the formula (2) $(R)_2SiO$ and difunctional organo-carboxyalkyl radicals having the formula (3) $(HOOCC_mH_{2m})(R)SiO$ where R and $m$ are as previously defined. In addition to these two predominant components, the carboxyalkylorganopolysiloxanes can also contain minor amounts of monoorganopolysiloxane units having the formula (4) $RSiO_{1.5}$ and triorganosiloxane units having the formula (5) $R_3SiO_{0.5}$ While the carboxyalkyl radicals are generally introduced into the carboxyalkylorganopolysiloxane in the form of units of Formula 3, it should be understood that in certain embodiments of the present invention, some or all of these carboxyalkyl radicals may be introduced as siloxane units having the formula (6) $(HOOCC_mH_{2m})SiO_{1.5}$ (7) $(HOOCC_mH_{2m})(R)_2SiO_{0.5}$ Where monofunctional or trifunctional siloxane units of Formulae 4 through 7 are included in the carboxyalkylorganopolysiloxane of Formula 1, the number of these units must be restricted so that the total number of silicon-bonded organic groups is within the range of from 1.999 to 2.001 organic groups per silicon atom.

As previously mentioned, the carboxyalkylorganopolysiloxanes of Formula 1 can be formed by the general methods described in the aforementioned French patent and the aforementioned Bluestein patent. A very useful method for forming these materials is by the hydrolysis of a cyanoalkylorganodichlorosilane having the formula (8) $(NCC_mH_{2m})(R)SiCl_2$ where R and $m$ are as previously defined, by the method of the aforementioned Bluestein Patent 2,900,363. This method comprises hydrolyzing this cyanoalkylorganodichlorosilane in a hydrolysis medium comprising concentrated aqueous hydrochloric acid. This hydrolysis step results in the hydrolysis of the cyano group to a carboxyl group and at the same time causes the formation of siloxane linkages so that the resulting product is a fairly low molecular weight material of a composition composed of siloxane units of Formula 3. This low molecular weight material is then equilibrated or co-condensed with an organopolysiloxane composed of diorganosiloxane units of Formula 2 in the presence or absence of other siloxane units of Formulae 4 through 7 to form the carboxyalkylorganopolysiloxane of Formula 1. This equilibrium or co-condensation is preferably accomplished by mixing the various low molecular weight organopolysiloxanes with small amounts of concentrated sulfuric acid and agitating the mixture for several hours. At the end of this time the resulting co-condensation product is dissolved in benzene and is washed thoroughly with water to remove all traces of sulfuric acid and the benzene solvent is evaporated to yield an organopolysiloxane gum within the scope of Formula 1 which has a viscosity of at least 100,000 centistokes when measured at 25° C.

One of the organopolysiloxanes composed of the units of Formula 2 which is most desirably employed in forming the carboxyalkylorganopolysiloxane is octamethylcyclotetrasiloxane. However, other diorganosiloxanes such as the linear hydrolysis product of any type of diorganodichlorosilane can be employed in place of the octamethylcyclotetrasiloxane.

The finely divided silica fillers which are employed in the practice of my invention are well known in the art and are the same silica fillers which are employed as fillers for conventional organopolysiloxanes. Generally, these silica fillers comprise extremely fine particles which provide a high surface area per unit weight, such as a surface of from 50 to 500 square meters or more per gram. These materials are commercially available as fumed silica, precipitated silica, silica aerogel, etc. Illustrative of the commercial finely divided silicas are Cab-O-Sil fumed silica, Hi-Sil X–303 precipitated silica and Santocel CS silica aerogel.

These fillers can be used in their untreated form or can be treated with methylpolysiloxanes as shown in Patent 2,938,009—Lucas.

The carbon which can be used as a filler in the composition of my invention includes any of the commercially available finely divided carbons such as lamp black, channel black, etc.

The amount of carbon or silica filler employed in the compositions of the present invention can vary within wide limits depending on the particular characteristics desired in the final product. Generally, the compositions contain from 20 to 300 parts of finely divided filler per 100 parts of the carboxylalkyl organopolysiloxane gum of Formula 1.

The polyvalent metal compounds which are used as curing catalysts in the composition of the present invention are many and varied. In general, these polyvalent metal compounds include metal oxides and metallic compounds formed from a metal ion and an ion of a readily volatilizable substance. The particular groups of polyvalent metal compounds which have been found most effective as catalysts in the present invention are selected from the class consisting of oxides, hydroxides, carbonates, salts of carboxylic acids containing up to 11 carbon atoms, alcoholates of alcohols containing up to 11 carbon atoms, and salts of enols containing up to 11 carbon atoms.

The range of polyvalent metals which comprise a portion of the metallic compound employed in the practice of the present invention are extremely varied and no metals have been found which are inoperative in the practice of the present invention so long as these metals are polyvalent, i.e., have a valence of two or more. Among the metallic compounds which are particularly effective in the practice of the present invention can be mentioned the metals of group I$b$, II$a$, II$b$, III$a$, IV$a$, IV$b$, V$a$, VII$b$, and VIII of the periodic table. Of the metals of these various groups recited above, those preferably employed as the metallic component of the metal compounds employed in the practice of the present invention are selected from the class consisting of magnesium, calcium, strontium, barium, titanium, zirconium, manganese, iron, cobalt, nickel, copper, zinc, cadmium, aluminum, tin, lead and antimony.

Representative of and illustrative of the polyvalent metal compounds which can be employed as curing agents in the compositions of the present invention are magnesium oxide, calcium octoate, calcium propionate, strontium carbonate, barium undecanate, zinc naphthenate, tetrabutyl titanate, zirconium acetate, zirconium octoate, manganese dioxide, the iron salt of the enol of acetylacetone, cobalt oxide, nickel hydroxide, cupric carbonate, zinc oxide, zinc octoate, zinc isopropoxide, zinc acetate, cadmium butyrate, the aluminum salt of the enol of acetylacetone, stannous octoate, stannic octoate, aluminum butyrate, lead oxide, antimony acetate, etc.

The amount of polyvalent metal compound employed in combination with the compositions of the present invention may vary within very wide limits. In general, satisfactory curing is effected when from 0.1 to 10 parts by weight and preferably from 0.3 to 5 parts by weight of the polyvalent metal compound per 100 parts of the carboxylalkylorganopolysiloxane of Formula 1 are employed. The use of additional polyvalent metal compound over 10 parts by weight per 100 parts of the carboxylalkylorganopolysiloxane produces no increased curing benefit to the cured silicone rubbers produced in accordance with the practice of the present invention.

While I do not wish to be bound by theory, it is believed that the polyvalent metal ion of the polyvalent metal compound catalyst of the present invention reacts with two or more carboxyalkyl groups of the organopolysiloxane to provide a cross-linking between molecules of the organopolysiloxane through the polyvalent metallic ion. For this reason, the use of more than 10 parts by weight of the polyvalent metal curing catalyst per 100 parts of the carboxyalkylorganopolysiloxane is unnecessary since 10 parts by weight of the metal compound curing catalyst is sufficient to provide the metal ions necessary to produce cross-linking of the type described above. Even where the number of metal ions available from the metal compound curing catalyst is less than the number theoretically required to provide the cross-linking metal ions between every pair of carboxyalkyl radicals of the carboxyalkyl organopolysiloxane, it is still found that curing takes place, so long as the minimum of 0.1 part of the polyvalent metal compound curing catalyst is present per 100 parts of the carboxyalkyl organopolysiloxane of Formula 1.

The polyvalent metallic compounds used as curing catalysts in the practice of the present invention are available in a number of commercial forms. Most of the metal compounds are available in solid form and in the preferred embodiment of my invention the metal compound curing catalyst is employed in this form. However, in other cases, such as in the case of many of the polyvalent metal octoates, the octoates are commercially available as a solution or dispersion in a suitable solvent or dispersing agent such as mineral spirits. In the practice of the present invention, these solutions or dispersions are satisfactorily employed without isolating the polyvalent metal compound.

The compositions of the present invention which comprise the carboxyalkylorganopolysiloxane of Formula 1, the carbon or silica filler and the polyvalent metal compound curing catalyst are formed by merely mixing the three ingredients together. This mixing may be done in any conventional fashion such as on standard rubber milling rolls or in a high shear mixer such as a Banbury mixer. Either of these procedures is satisfactory regardless of whether the polyvalent metal curing catalyst is employed as a solid or in the form of a solution or dispersion. The only necessary element of the mixing is to mix the three ingredients sufficiently so that a uniform mixture is obtained.

The three component composition of the present invention can be cured in the same manner as conventional curable organopolysiloxane compositions. Thus, these compositions may be pre-cured or formed into shape in a heated press employing, for example, a temperature of 150° C. for five minutes, with a subsequent post-cure at a temperature of from about 150 to 250° C. for a time which can vary from about 16 hours to 72 hours or more. While these compositions can be cured by the various heating cycles described above, one of the unusual and unexpected features of the compositions of the present invention is that the compositions will cure at room temperature if allowed to stand at room temperature for a period of time which varies from about 48 hours to one week, depending on the particular composition, the catalyst level and the ratio of the carboxyalkyl groups to the silicon atoms in the carboxyalkyl organopolysiloxane of Formula 1.

The following examples are illustrative of the practice of the present invention and are not intended for purposes of limitation. All parts are by weight.

*Example 1*

This example illustrates the preparation of a methyl-$\beta$-carboxyethylpolysiloxane within the scope of Formula 1 having a viscosity of about 500,000 centistokes when measured at 25° C., where $a$ has a value of 0.001 and the sum of $a+b$ is 2.00. One hundred parts of methyl-$\beta$-cyanoethyldichlorosilane was added with stirring to about 225 parts of concentrated aqueous HCl containing about 35 percent by weight of HCl. This addition was carried out in about 10 minutes, the mixture was boiled for several hours and a clear solution was obtained. Two hundred parts of water was added and the resulting precipitated fluid was separated. It was purified by repeated solution in 200 parts of boiling water and precipitated from the cooled solution. The methyl-$\beta$-carboxyethylpolysiloxane was dried in a 120° C. oven for 8 hours to give a low molecular weight fluid consisting essentially of methyl-$\beta$-carboxyethylsiloxane units. This methyl-$\beta$-carboxyethylsiloxane was mixed with octamethylcyclotetrasiloxane in sufficient amount to provide 0.1 mole methyl-$\beta$-carboxyethylsiloxane units per 99.9 moles of dimethylsiloxane units. To 100 parts of the mixture was added 10 parts of 87 percent aqueous concentrated sulfuric acid and the mixture was stirred for 20 hours. At the end of this time the resulting product dissolved in 500 parts of benzene was washed repeatedly with water to remove all traces of sulfuric acid, the acid-free product was dried over calcium sulfate and the dried product was stripped under vacuum to remove the benzene, resulting in the methyl-$\beta$-carboxyethylpolysiloxane containing methyl-$\beta$-carboxyethylsiloxane units and dimethylsiloxane units in the ratio of 0.1 mole percent of the former to 99.9 mole percent of the latter. This material had a viscosity of about 500,000 centistokes when measured at 25° C.

*Example 2*

One hundred parts of the gum of Example 1, which contained 0.1 percent methyl-$\beta$-carboxyethylsiloxane units, was compounded with 40 parts of precipitated silica and 1.0 or 5.0 parts of stannous octoate (as a 28 percent stannous octoate solution in mineral spirits) in a rubber mill. A number of sheets of these compounds were then formed in a press employing a temperature of 125° C. for 5 minutes and various of these sheets were post-cured for varying times and varying temperatures and the hardness, tensile strength, and elongation were measured. In Table I below are listed the parts of tin octoate per 100 parts of the gum, the post-cure employed, the hardness of the post-cured sheets on the Shore A scale, the tensile strength in pounds per square inch, and the elongation in percent.

TABLE I

| Parts stannous octoate, 28% tin | Cure, °C/hours | Hardness | Tensile | Elongation |
|---|---|---|---|---|
| 1.0 | 150/16 | 24 | 120 | 260 |
| 1.0 | 250/16 | 34 | 820 | 550 |
| 1.0 | 250/72 | 41 | 780 | 430 |
| 5.0 | 150/16 | 30 | ------ | 170 |
| 5.0 | 250/16 | 52 | 620 | 260 |
| 5.0 | 250/72 | 65 | 830 | 180 |

*Example 3*

Following the procedure of Example 1, a gum having a viscosity of about 2,000,000 centistokes when measured at 25° C. was formed which consisted essentially of 0.2 percent methyl-$\beta$-carboxyethylsiloxane units and 99.8 mole percent dimethylsiloxane units. To 100 parts of this gum was added 40 parts of fumed silica and various amounts of stannous octoate, added as a 28 percent solution in mineral spirits, or zinc oxide. Sheets of these compounds were formed in a press at 125° C. for 10 minutes and then oven cured for various times and physical properties were measured. In Table II below are listed the parts of the metal compound per 100 parts of the gum, the oven cure, the hardness, the tensile and the elongation.

TABLE II

| Parts metal compound | Cure, °C./hours | Hardness | Tensile | Elongation |
|---|---|---|---|---|
| 0.7 stannous octoate (28% tin) | 150/16 | 35 | 580 | 410 |
| | 250/16 | 41 | 820 | 480 |
| | 250/72 | 45 | 640 | 480 |
| 1.7 stannous octoate (28% tin) | 150/16 | 34 | 320 | 350 |
| | 250/16 | 40 | 770 | 460 |
| | 250/72 | 40 | 740 | 440 |
| 0.32 ZnO | 150/16 | 25 | | 150 |
| | 250/16 | 40 | 380 | 300 |
| | 250/72 | 44 | 650 | 370 |
| 1.0 ZnO | 150/16 | 22 | | 120 |
| | 250/16 | 37 | 450 | 380 |
| | 250/72 | 39 | 670 | 390 |

*Example 4*

An additional amount of the gum of Example 3 was mixed with fumed silica and various amounts of various metal compound catalysts. In each case 100 parts gum and 40 parts of the silica filler were employed. After the addition of the curing compound and the formation of sheets by the method described above, each sheet was cured for 16 hours at 150° C. and for 16 hours at 250° C. and physical properties were measured. In Table III below are listed the parts of curing catalyst per 100 parts gum, the hardness, tensile strength, and elongation of the cured sheets.

TABLE III

| Curing Catalyst | Hardness | Tensile | Elongation |
|---|---|---|---|
| 0.6 tetrabutyl titnanate | 49 | 610 | 400 |
| 0.25 stannous octoate (28% tin) | 43 | 610 | 390 |
| 0.6 aluminum t-butoxide | 46 | 640 | 360 |
| 1.0 zirconium acetate | 50 | 580 | 350 |

*Example 5*

Following the procedure of Example 1, a gum having a viscosity of about 100,000 centistokes when measured at 25° C. was prepared containing 0.3 mole percent methyl-β-carboxyethylsiloxane units and 99.7 mole percent dimethylsiloxane units. This gum was compounded with precipitated silica and various metal compounds in the ratio of 100 parts gum, 40 parts silica and various parts of the metal compounds. These compounds were formed into sheets and cured in the manner of Example 4. Table IV below lists the parts of metal curing compound per 100 parts of gum, the hardness, tensile, and elongation of the resulting cured sheets.

TABLE IV

| Curing Catalyst | Hardness | Tensile | Elongation |
|---|---|---|---|
| 3.3 stannous octoate (28% tin) | 55 | 610 | 200 |
| 1.0 calcium propionate | 44 | 580 | 370 |
| 1.0 zinc propionate | 40 | 540 | 270 |
| 1.0 aluminum acetylacetonate | 55 | 730 | 290 |

*Example 6*

Following the procedure of Example 1, a methyl-β-carboxyethylpolysiloxane was formed which had a viscosity of about 1,000,000 centistokes when measured at 25° C. and which contained 0.6 mole percent methyl-β-carboxyethylsiloxane units and 1.94 mole percent dimethylsiloxane units. Following the procedure of Example 4, a number of sheets were formed from 100 parts of the gum, 40 parts of precipitated silica and various parts of various metal catalysts. After forming sheets from these various compositions and curing the sheets in accordance with the method of Example 4, physical properties were measured. The parts of metal compound catalysts per 100 parts of gum and the physical properties are recorded in Table V below.

TABLE V

| Curing Catalyst | Hardness | Tensile | Elongation |
|---|---|---|---|
| 0.7 stannous octoate (28% tin) | 46 | 680 | 290 |
| 1.7 stannous octoate (28% tin) | 54 | 670 | 260 |
| 1.8 stannous octoate (28% tin) | 43 | 770 | 280 |
| 0.3 ZnO | 51 | 590 | 240 |
| 1.0 ZnO | 49 | 600 | 240 |
| 2.2 zinc octoate (22% zinc) | 52 | 870 | 250 |
| 2.7 zirconium octoate (5% zirconium) | 70 | 390 | 120 |

*Example 7*

Following the procedure of Example 1, a methyl-β-carboxyethylpolysiloxane gum was prepared which had a viscosity of about 1,000,000 centistokes when measured at 25° C. and which contained 1.8 mole percent methyl-β-carboxyethylsiloxane units and 98.2 mole percent dimethylsiloxane units. Following the procedure of Example 4, sheets were formed from portions of compositions containing 100 parts of the gum, 40 parts silica aerogel and various parts of various metal compounds. In Table VI below are listed the parts of metal compound per 100 parts of this gum and the physical properties obtained from cured sheets of this gum.

TABLE VI

| Curing Catalyst | Hardness | Tensile | Elongation |
|---|---|---|---|
| 1.0 zinc acetate | 65 | 400 | 70 |
| 0.5 ZnO | 64 | 350 | 70 |

*Example 8*

Following the procedure of Example 1, a methyl-β-carboxyethylpolysiloxane gum was prepared which had a viscosity of about 1,000,000 centistokes at 25° C. and which contained 3 mole percent methyl-β-carboxyethylsiloxane units and 97 mole percent dimethylsiloxane units. Following the procedure of Example 4, sheets were formed from a composition containing 100 parts of the gum, 40 parts of finely divided carbon black and 4 parts of zinc oxide. These cured sheets had physical properties comparable to the physical properties of the sheets of Example 7.

While the foregoing examples have necessarily been limited to fewer than all of the many possible modifications of the compositions of my invention, it should be understood that in addition to these specific polyvalent metal compounds illustrated in the examples, many other metal compounds of the class described can also be employed as curing catalysts for carboxyalkyl organopolysiloxanes of the specific type illustrated in the examples as well as of the other types described in the foregoing description. In addition, the proportions of the ingredients may be varied widely as mentioned previously.

The organopolysiloxane compositions of the present invention have the same utility as conventional organopolysiloxanes. Thus, these compositions may be molded into desired shapes to form gaskets and the like for service at elevated temperature. In addition, these compositions can be extruded over electrical conductors and cured at elevated temperatures or at room temperature to form insulated electrical conductors. Furthermore, the unique room temperature curing characteristics of the compositions of the present invention allow their use as encapsulating agents for electrical components which require an insulation which will withstand relatively high operating temperatures but which cannot stand an initial cure at the temperatures required for the curing of conventional organopolysiloxanes. For example, a miniature transformer containing polyester insulation on the windings can be encapsulated with a composition of the type described in Example 2 and the encapsulated assembly allowed to stand at room temperature for about 96 hours, at which time the composition of Example 2 is fully cured and has developed its excellent physical properties.

What I claim as new and desire to secure by Letters Patent of the United States is:

1. A curable composition comprising (A) an organopolysiloxane having a viscosity of at least 100,000 centistokes when measured at 25° C. and containing an average of about 2 organic groups per silicon atom, from about 0.01 to 10 percent of the silicon atoms in said organopolysiloxane being attached to a carboxyalkyl radical, with the remaining organic groups being selected from the class consisting of monovalent hydrocarbon radicals, halogenated monovalent hydrocarbon radicals and cyanoalkyl radicals, (B) a filler selected from the class consisting of finely divided silica and finely divided carbon and (C) as a curing agent, a polyvalent metal compound selected from the class consisitng of polyvalent metal oxides, polyvalent metal hydroxides, polyvalent metal carbonates, polyvalent metal salts of carboxylic acids containing up to 11 carbon atoms, polyvalent metal alcoholates of alcohols containing up to 11 carbon atoms, and polyvalent metal salts of enols containing up to 11 carbon atoms.

2. A cured composition of claim 1.

3. A curable composition comprising (A) an organopolysiloxane having the formula

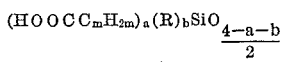

where R is a member selected from the class consisting of monovalent hydrocarbon radicals, halogenated monovalent hydrocarbon radicals and cyanoalkyl radicals, $a$ has a value of from 0.001 to 0.1, the sum of $a+b$ is equal to from 1.999 to 2.001, $m$ is an integer equal to from 2 to 3, inclusive, and (B) a filler selected from the class consisting of finely divided silica and finely divided carbon and (C) as a curing agent, a polyvalent metal compound selected from the class consisting of polyvalent metal oxides, polyvalent metal hydroxides, polyvalent metal carbonates, polyvalent metal salts of carboxylic acids containing up to 11 carbon atoms, polyvalent metal alcoholates of alcohols containing up to 11 carbon atoms, and polyvalent metal salts of enols containing up to 11 carbon atoms.

4. The cured composition of claim 3.

5. A curable composition comprising (A) an organopolysiloxane having the formula

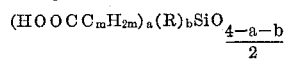

where R is a member selected from the class consisting of monovalent hydrocarbon radicals, halogenated monovalent hydrocarbon radicals, and cyanoalkyl radicals, $n$ has a value of from 0.001 to 0.1, the sum of $a+b$ is equal to from 1.999 to 2.001, $m$ is an integer equal to from 2 to 3, inclusive, and (B) a filler selected from the class consisting of finely divided silica and finely divided carbon and (C) as a curing agent, a polyvalent metal compound selected from the class consisting of polyvalent metal oxides, polyvalent metal hydroxides, polyvalent metal carbonates, polyvalent metal salts of carboxylic acids containing up to 11 carbon atoms, polyvalent metal alcoholates of alcohols containing up to 11 carbon atoms, and polyvalent metal salts of enols containing up to 11 carbon atoms.

6. The cured product of claim 5.

7. A curable composition comprising (A) an organopolysiloxane having a viscosity of at least about 100,000 centistokes when measured at 25° C. and containing an average of about 2 organic groups per silicon atom with from 0.1 to 10 percent of the silicon atoms containing a silicon-bonded β-carboxyethyl radical and with the remainder of the organo groups being methyl radicals, (B) a finely divided silica filler and (C) as a curing agent, a polyvalent metal compound selected from the class consisting of polyvalent metal oxides, polyvalent metal hydroxides, polyvalent metal carbonates, polyvalent metal salts of carboxylic acids containing up to 11 carbon atoms, polyvalent metal alcoholates of alcohols containing up to 11 carbon atoms and polyvalent metal salts of enols containing up to 11 carbon atoms.

8. The cured product of claim 7.

9. The curable composition of claim 7 in which the polyvalent metal compound is zinc oxide.

10. The curable composition of claim 7 in which the metal component of the metal compound is zinc.

11. The curable composition of claim 7 in which the metal component of the metal compound is tin.

12. The curable composition of claim 7 in which the metal component of the metal compound is zirconium.

13. The curable composition of claim 7 in which the metal compound is tetrabutyl titanate.

14. The process for curing a composition comprising a filler selected from the class consisting of finely divided silica and finely divided carbon and an organopolysiloxane having a viscosity of at least 100,000 centistokes when measured at 25° C. and having the formula

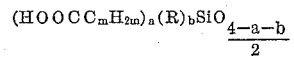

where R is a member selected from the class consisting of monovalent hydrocarbon radicals, halogenated monovalent hydrocarbon radicals and cyanoalkyl radicals, $a$ has a value of from 0.001 to 0.1, inclusive, the sum of $a+b$ is equal to from 1.999 to 2.001 and $m$ is an integer equal to from 2 to 3, inclusive, which process comprises adding to said composition as a curing agent a polyvalent metal compound selected from the class consisting of polyvalent metal oxides, polyvalent metal hydroxides, polyvalent metal carbonates, polyvalent metal salts of carboxylic acids containing up to 10 carbon atoms, polyvalent metal alcoholates of alcohols containing up to 11 carbon atoms, and polyvalent metal salts of enols containing up to 11 carbon atoms.

15. The curable composition of claim 5 in which the polyvalent metal in the polyvalent metal compound is selected from the class of metals in groups I$b$, II$a$, II$b$, III$a$, IV$a$, IV$b$, V$a$, VII$b$ and VIII of the periodic table.

References Cited in the file of this patent

UNITED STATES PATENTS

| 2,453,562 | Wright | Nov. 9, 1948 |
| 2,480,620 | Warrick | Aug. 30, 1949 |
| 2,842,515 | Agens | July 8, 1958 |

FOREIGN PATENTS

| 1,189,989 | France | Mar. 31, 1959 |